US012434358B2

(12) United States Patent
Davis

(10) Patent No.: US 12,434,358 B2
(45) Date of Patent: Oct. 7, 2025

(54) LIMITED CLEARANCE TOOL

(71) Applicant: PRIMESOURCE CONSULTING LLC, Herriman, UT (US)

(72) Inventor: John Davis, Herriman, UT (US)

(73) Assignee: PRIMESOURCE CONSULTING LLC, Herriman, UT (US)

( * ) Notice: Subject to any disclaimer, the term of this patent is extended or adjusted under 35 U.S.C. 154(b) by 354 days.

(21) Appl. No.: 18/175,576

(22) Filed: Feb. 28, 2023

(65) Prior Publication Data

US 2024/0286253 A1 Aug. 29, 2024

(51) Int. Cl.
*B25B 21/00* (2006.01)

(52) U.S. Cl.
CPC .......... *B25B 21/005* (2013.01); *B25B 21/002* (2013.01)

(58) Field of Classification Search
CPC ......... B25B 13/00; B25B 13/46; B25B 21/00; B25B 21/002; B25B 21/005; B25B 21/008; B25B 23/00; B25B 23/14; B25B 23/145; B25B 23/1453; B25B 23/1456; B25B 27/14; B25F 5/02; B25F 5/005
See application file for complete search history.

(56) References Cited

U.S. PATENT DOCUMENTS 625,529 A 5/1899 Andress
910,712 A 1/1909 McCoy
3,263,727 A 8/1966 Herpolsheimer
3,417,802 A 12/1968 Oldenkoft
3,759,119 A 9/1973 Wing
4,027,561 A * 6/1977 Junkers ................ B25B 21/002 81/57.39

(Continued)

FOREIGN PATENT DOCUMENTS

DE 684468 C 11/1939
DE 2413760 A1 11/1974

(Continued)

OTHER PUBLICATIONS

International Search Report and Written Opinion from Corresponding International Application No. PCT/US2023/063386, dated Aug. 21, 2023, 63 pages.

(Continued)

*Primary Examiner* — Robert J Scruggs
(74) *Attorney, Agent, or Firm* — RANKIN, HILL & CLARK LLP

(57) ABSTRACT

A limited clearance hydraulic tool provides torque to an associated threaded fastener assembly. The limited clearance hydraulic tool includes a piston and a ratchet wheel. The limited clearance hydraulic tool also includes a drive plate and a piston rod extending between the drive plate and the piston. The limited clearance hydraulic tool further includes a connection pin that defines a first point of contact between the piston rod and the drive plate and continuously connects the piston rod and the drive plate together to always drive and retract the drive plate. Additionally, the limited clearance hydraulic tool includes a push plate that defines a second point of contact between the piston rod and the drive plate. The push plate is separate and unique from the first point of contact. The push plate selectively connects the piston rod and the drive plate together for driving the drive plate.

25 Claims, 8 Drawing Sheets

(56) References Cited

U.S. PATENT DOCUMENTS

| | | | |
|---|---|---|---|
| 4,538,313 A | 9/1985 | Frieberg | |
| 4,708,555 A | 11/1987 | Terry | |
| 5,080,545 A | 1/1992 | McKinlay | |
| 5,318,397 A | 6/1994 | Junkers | |
| 5,341,560 A | 8/1994 | Junkers | |
| 5,499,558 A | 3/1996 | Junkers | |
| 5,538,379 A | 7/1996 | Junkers | |
| 5,539,970 A | 7/1996 | Junkers | |
| 5,626,449 A | 5/1997 | McKinlay | |
| 5,640,749 A | 6/1997 | Junkers | |
| 5,946,789 A | 9/1999 | Junkers | |
| 6,152,243 A | 11/2000 | Junkers | |
| 6,223,836 B1 * | 5/2001 | Turoff | B25B 21/005 81/57.39 |
| 6,230,589 B1 | 5/2001 | Junkers | |
| 6,254,323 B1 | 7/2001 | Junkers | |
| 6,461,093 B1 | 10/2002 | Junkers | |
| 6,490,952 B2 | 12/2002 | Junkers | |
| 6,609,868 B2 | 8/2003 | Junkers | |
| 6,883,401 B2 | 4/2005 | Junkers | |
| 6,929,439 B2 | 8/2005 | Junkers | |
| 6,986,298 B2 | 1/2006 | Junkers | |
| 7,003,862 B2 | 2/2006 | Junkers | |
| 7,066,053 B2 | 6/2006 | Junkers | |
| 7,082,858 B2 | 8/2006 | Knopp et al. | |
| 7,125,213 B2 | 10/2006 | Junkers | |
| 7,158,902 B2 | 1/2007 | Damodaran et al. | |
| 7,188,552 B1 | 3/2007 | Koppenhoefer | |
| 7,207,760 B2 | 4/2007 | Junkers | |
| 7,261,506 B2 | 8/2007 | Smolarek | |
| 7,520,128 B1 * | 4/2009 | Rosa | B25B 23/145 81/470 |
| 7,735,397 B2 | 6/2010 | Junkers | |
| 7,765,895 B2 | 8/2010 | Junkers | |
| 7,832,310 B2 | 11/2010 | Junkers | |
| 8,631,724 B2 | 1/2014 | Miyata | |
| 9,011,060 B2 | 4/2015 | Hyatt | |
| 9,308,632 B2 | 4/2016 | Junkers | |
| 10,107,325 B2 | 10/2018 | Davis et al. | |
| 11,396,902 B2 | 7/2022 | Davis | |
| 11,534,894 B2 | 12/2022 | Davis | |
| 2013/0319183 A1 * | 12/2013 | Clover | B25B 13/481 81/57.44 |
| 2016/0311089 A1 * | 10/2016 | Davis | B25B 21/005 |
| 2016/0375563 A1 * | 12/2016 | Junkers | B25F 5/026 81/467 |

FOREIGN PATENT DOCUMENTS

| | | |
|---|---|---|
| WO | 2015095425 A2 | 6/2015 |
| WO | 2015100115 A2 | 7/2015 |
| WO | 2015152728 A1 | 10/2015 |

OTHER PUBLICATIONS

Bolting Systems International (BSI), "The Tomahawk Tool". Operations, Maintenance and Parts Manual, Rev. 1, BD-TOM001-A, 34 pages.

ASTM International, Standard Specification for Hardened Steel Backup and Reaction Washers Inch and Metric Dimensions 1,2:, Designation: F3394/F3394M-20, Licensed to Primesource Consulting LLC user, 7 pages.

* cited by examiner

LIMITED CLEARANCE TOOL

BACKGROUND

Hydraulically driven ratcheting torque tools generate an accurate bolt load through the rotation of a fastener. Standard hydraulic torque tools sometimes utilize a reaction arm affixed to a housing of the tool. This arm provides a means of abutment so that the tool can generate a tightening force into the fastener and not simply rotate around the axis of the fastener. Alternatively, a reaction washer can be used to provide an abutment means for the tool, where the reaction washer is a component to the threaded fastener assembly. In particular, the reaction washer is placed directly below the nut or bolt head being subjected to the intended tightening force. Further, the reaction washer is connected to the tool housing.

However, the known tools can be inefficient to operate and require significant maintenance to keep them operational. Further, they can be heavy and unwieldy to operate. In view of the above difficulties, a better tool is needed.

SUMMARY

In view of the foregoing, a limited clearance hydraulic tool provides torque to an associated threaded fastener assembly. The limited clearance hydraulic tool includes a housing that receives hydraulic fluid and defines a piston cylinder. The piston cylinder defines a cylinder axis. The limited clearance hydraulic tool also includes a piston slidingly disposed within the piston cylinder of the housing that outputs force and travels between a retracted position and an extended position and a ratchet wheel rotatably received in the housing. The ratchet wheel defines a ratchet axis and is configured to engage the associated threaded fastener assembly. The limited clearance hydraulic tool also includes a drive plate disposed within the housing so as to at least partially radially surround the ratchet wheel and a piston rod extending between the drive plate and the piston.

The limited clearance hydraulic tool further includes a connection pin that defines a first point of contact between the piston rod and the drive plate. The connection pin continuously connects the piston rod and the drive plate together to always drive and retract the drive plate by transmitting the force from the piston to the drive plate. Additionally, the limited clearance hydraulic tool includes a push plate that defines a second point of contact between the piston rod and the drive plate. The push plate is separate and unique from the first point of contact. The push plate selectively connects the piston rod and the drive plate together for driving the drive plate.

DETAILED DESCRIPTION

Figure 1:
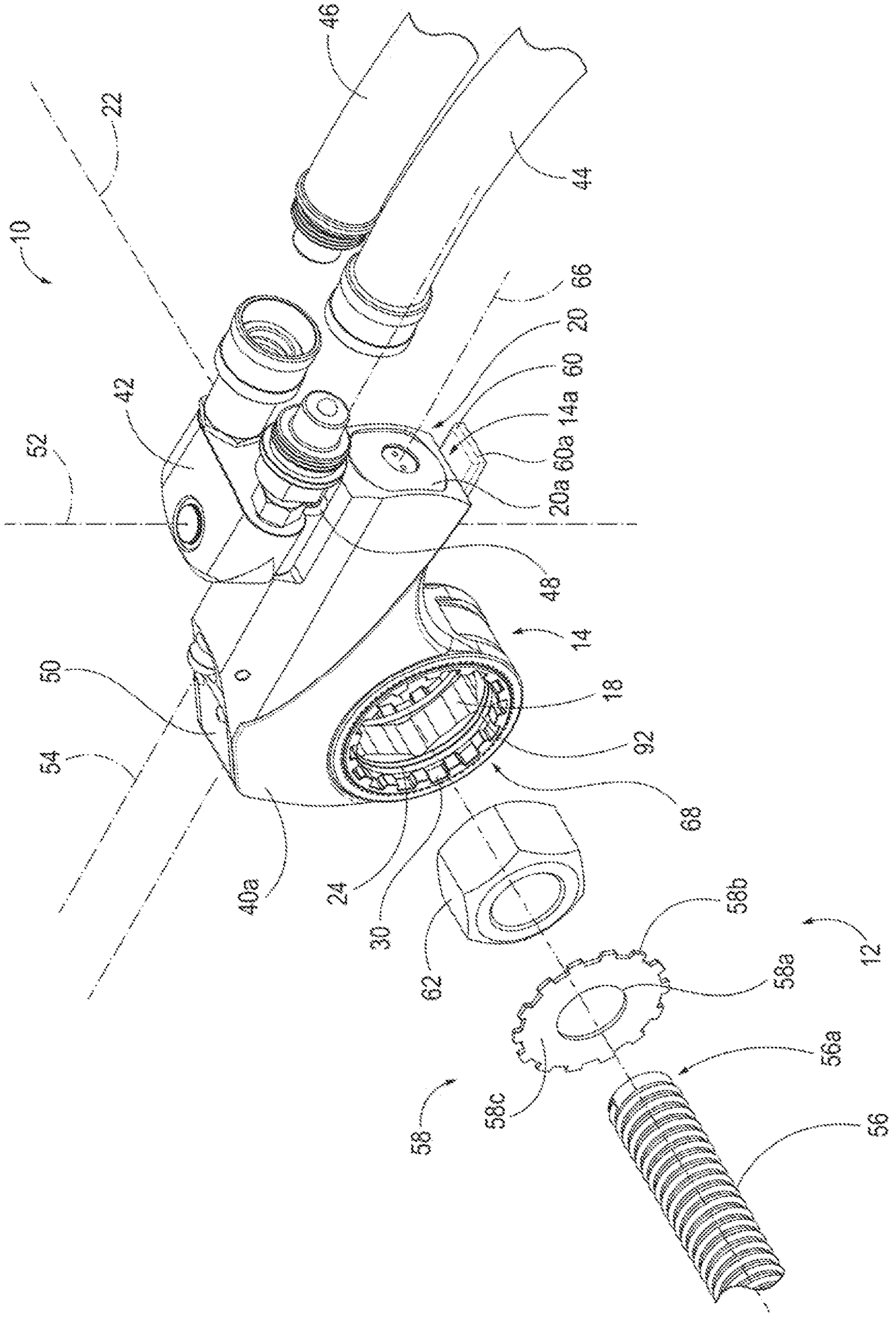
FIG. 1 is a perspective view of a limited clearance hydraulic tool and a threaded fastener assembly.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIGS. 1-6 schematically depict a limited clearance hydraulic tool 10 according to the present disclosure.

The limited clearance hydraulic tool 10 provides torque to an associated threaded fastener assembly 12 (FIG. 1). The limited clearance hydraulic tool 10 can be used to tighten or loosen the associated threaded fastener assembly 12. As will be described in more detail hereinafter, the limited clearance hydraulic tool 10 can include a housing 14 that defines a channel **14*a*, a piston 16, a ratchet wheel 18 that defines a ratchet axis 22, a magnetic ring 24, a drive plate 26, a pawl 28, a piston rod 32, a connection pin 34, a pawl spring 36, a push plate 38, a first overlay 40*a*, a second overlay 40*b*, and a swivel head 42. Further, the limited clearance hydraulic tool 10 can be fluidically connected to an associated first main line 44 and an associated second main line 46. Further still, the limited clearance hydraulic tool 10 can include a swivel body 48, a shroud 50, and a reaction pad 60. Additionally, the swivel head 42 can define a pivot head axis 52 and a pivot body axis 54**.

Initially, it is instructive to review the components of the associated threaded fastener assembly 12 to which the limited clearance hydraulic tool 10 engages to perform work. As illustrated in FIG. 1, the associated threaded fastener assembly 12 can include a threaded portion 56 with a free end **56*a*, a reaction washer 58 that defines an inner diameter 58*a* and an outer diameter 58*b* and includes an engagement face 58*c*, and a nut 62. The threaded portion 56 could be part of a bolt or stud that is threadingly engaged by the nut 62. The reaction washer 58 is disposed on the threaded portion 56 so that the nut 62 is between the reaction washer 58 and the free end 56*a* of the threaded portion 56 along the ratchet axis 22 so as to engage the limited clearance hydraulic tool 10** as will be described in more detail hereinafter.

The reaction washer 58 can slidingly and coaxially receive the threaded portion 56 and the nut 62 can threadingly and coaxially receive the threaded portion 56, both along the ratchet axis 22 when the limited clearance hydraulic tool 10 engages the associated threaded fastener assembly 12. As noted hereinbefore, the limited clearance hydraulic tool 10 can be utilized to tighten or loosen the associated threaded fastener assembly 12. As will be appreciated, this means that the nut 62 would travel along the threaded portion 56 toward the free end **56*a* of the threaded portion 56 when the associated threaded fastener assembly 12 is being loosened so that the nut 62 could be removed from the threaded portion 56 and the nut 62 would travel along the threaded portion 56 away from the free end 56***a* of the threaded portion 56 when the associated threaded portion 56 is being tightened so that the nut 62 cannot be removed from the threaded portion 56. Although not illustrated, it will be understood that an object (such as a machine housing 14) that is static with respect to the nut 62, either receives or is attached to the threaded portion 56 distal to the free end 56*a* so as to provide a surface to which the reaction washer 58 and the nut 62 can be tightened (i.e., preventing linear movement of the reaction washer 58 and the nut 62 along the ratchet axis 22 away from the free end 56*a*).

Further, it is noted that the reaction washer 58 can be configured by various methods to prevent rotation thereof about the threaded portion 56 with respect to the object. These configurations could include, for example, protrusions, raised patterns, or serrations so as to provide a high friction element on the engagement face 58*c* of the reaction washer 58 that would face toward the object and away from the free end 56*a*. Thus, this high friction element of the engagement face 58*c* of the reaction washer 58 engages the object to help prevent rotation of the reaction washer 58 with respect to the threaded portion 56 or the nut 62. As will be described in more detail hereinafter, the limited clearance hydraulic tool 10 engages the reaction washer 58 so that the housing 14 of the reaction washer 58 remains stationary with respect to the reaction washer 58, and hence, the object.

Figure 3:
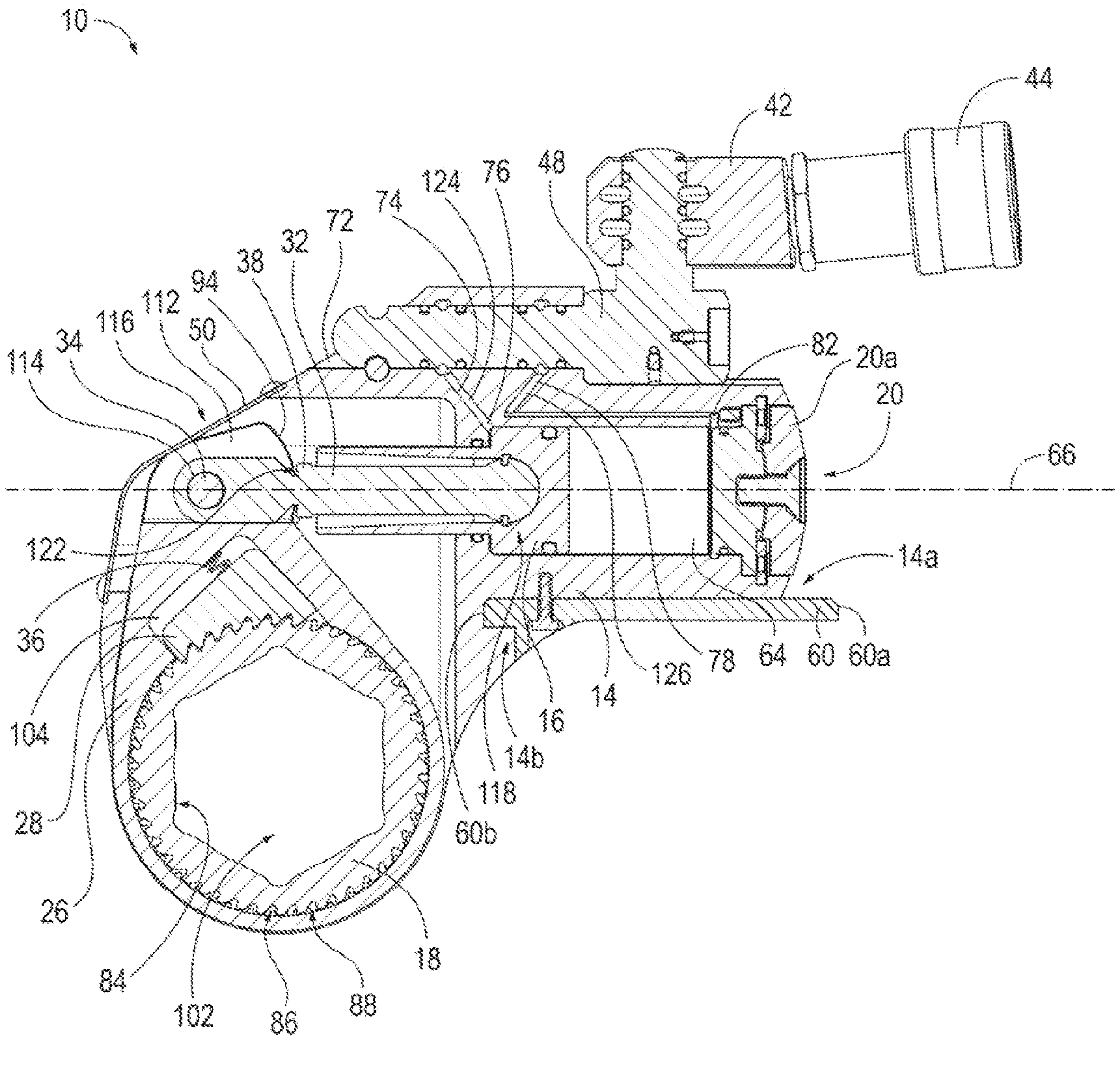
FIG. 3 is an elevation sectional view of the limited clearance hydraulic tool with a piston of the limited clearance hydraulic tool fully extended in an unloaded condition.
Figure 4:
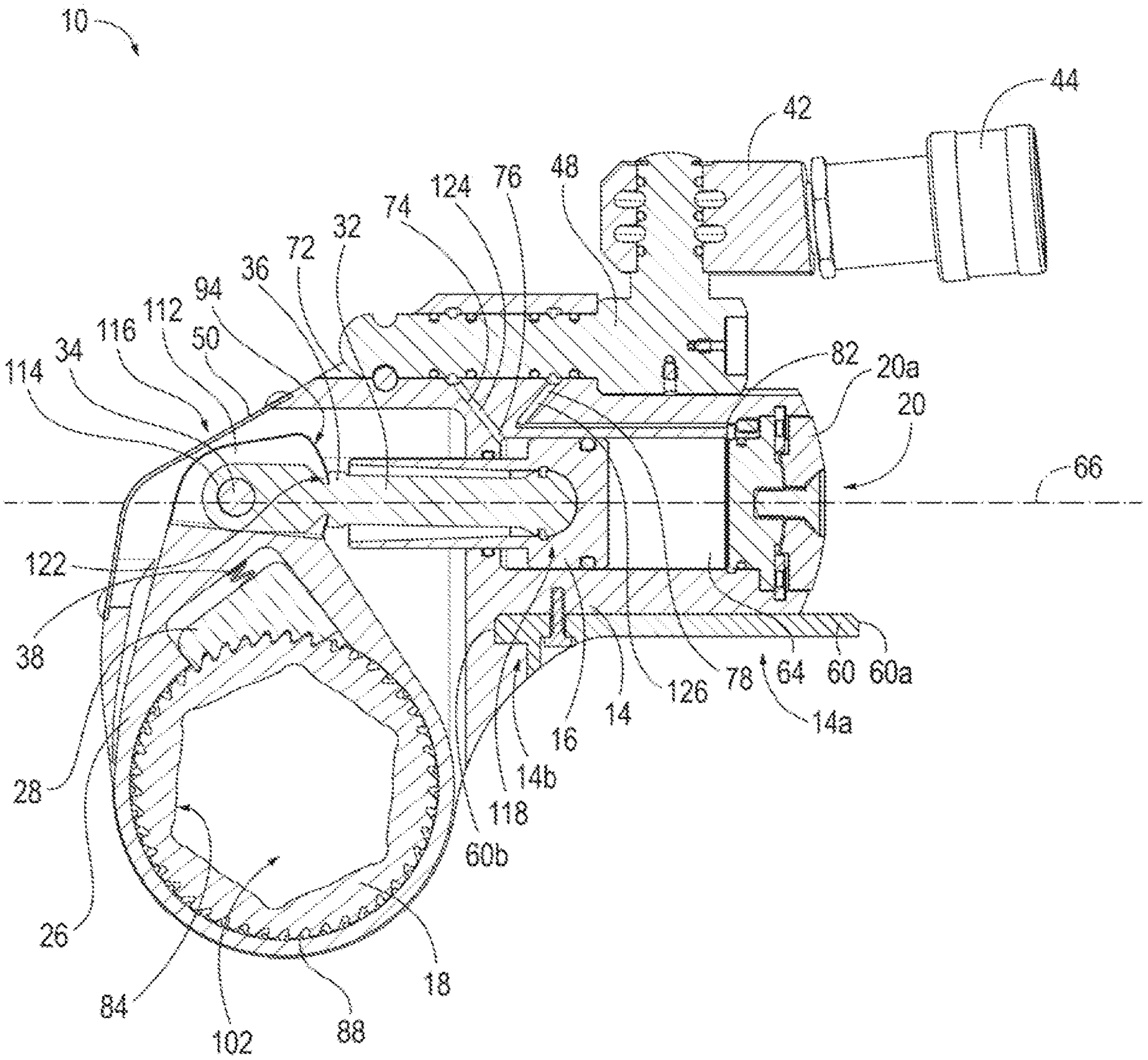
FIG. 4 is an elevation sectional view of the limited clearance hydraulic tool with the piston of the limited clearance hydraulic tool partially extended in a loaded condition.
Figure 5:
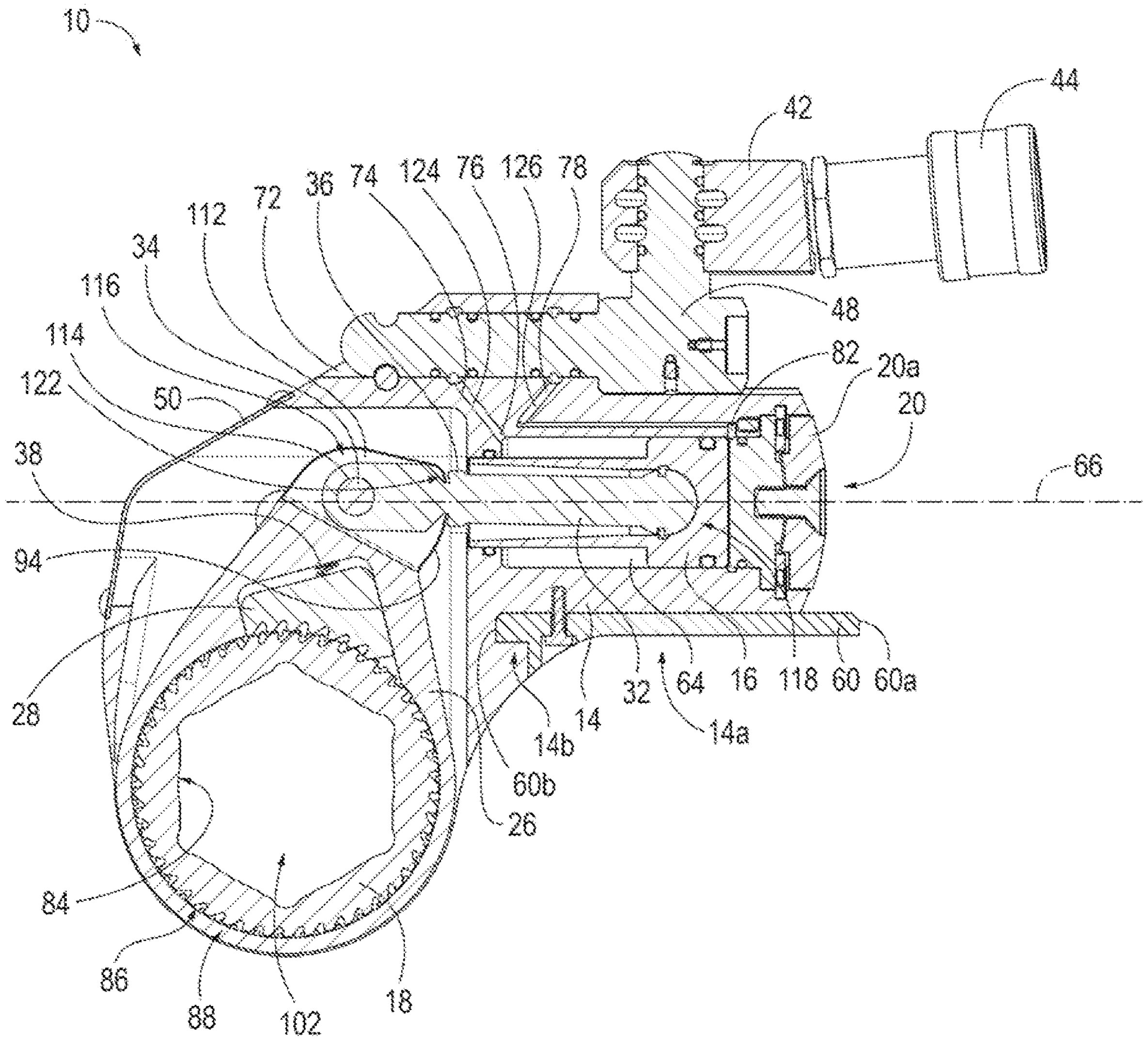
FIG. 5 is an elevation sectional view of the limited clearance hydraulic tool with a piston of the limited clearance hydraulic tool fully retracted.

With reference to FIGS. 3-5, the housing 14 of the limited clearance hydraulic tool 10 defines a piston cylinder 64 and receives hydraulic fluid. The hydraulic fluid is communicated to/from the limited clearance hydraulic tool 10 through the associated first main line 44 and the associated second main line 46. Additionally, the piston cylinder 64 can define a cylinder axis 66. The endcap 20*a* of the endcap assembly 20 can be disposed on the cylinder axis 66.

The housing 14 can at least partially contain the piston 16, the ratchet wheel 18, the drive plate 26, and the piston rod 32. The housing 14 can be of mono-block construction that includes an integral receiving member 68 that is configured to engage the associated reaction washer 58 of the associated threaded fastener assembly 12 as detailed below. The integral receiving member 68 can include a pair of hoops 68*a*, 68*a*. The hoops 68*a*, 68*a* may be at least partially spaced from one another so as to receive the ratchet wheel 18. Further, each of the hoops 68*a*, 68*a* can define a hoop inner diameter 68*b*, 68*b*. As illustrated, the hoop inner diameters 68*b*, 68*b* are splined for engagement with the castle spline hubs 30 as will be described in more detail hereinafter. As will be appreciated, due to the symmetric layout of limited clearance hydraulic tool 10 (i.e., with regard to a plane created by the pivot head axis 52 and the pivot body axis 54), the limited clearance hydraulic tool 10 can engage the reaction washer 58 and nut 62 from either side of the plane created by the pivot head axis 52 and the pivot body axis 54 to change the rotational direction of the ratchet 18 (i.e., to tighten or loosen the nut 62).

These improvements result in the limited clearance hydraulic tool 10 being of reduced weight as compared to conventional tools and also an improved profile that can be utilized in tight spaces. Further, as shown in the figures, the limited clearance hydraulic tool 10 can also include an endcap assembly 20 attached to the housing 14. The endcap assembly 20 can include a variety of elements that are either separate or integral that cooperate to seal the housing 14. For example, the endcap assembly 20 can include an endcap 20*a*. The endcap 20*a* can be removably attached to the housing 14 and provide a smooth design surface for the limited clearance hydraulic tool 10. Further, the endcap 20*a* can help to prevent unintentional access into the limited clearance hydraulic tool 10. Further still, the endcap assembly 20 can be detachable from the housing 14.

As mentioned hereinbefore, the limited clearance hydraulic tool 10 can include the first overlay 40*a* and the second overlay 40*b*. As shown in FIG. 1, the first overlay 40*a* and the second overlay 40*b* can be removably attached to the housing 14. The first overlay 40*a* and the second overlay 40*b* can be attached to the housing 14 by a variety of methods and can be made of the same or different materials than the housing 14. The limited clearance hydraulic tool 10 can also include the shroud 50. The shroud 50 can be removably attached to the housing 14 on a side of the limited clearance hydraulic tool 10 that is opposite of the endcap 20*a*. The shroud 50 can provide a smooth design surface for the limited clearance hydraulic tool 10. Further, the shroud 50 can help to prevent unintentional access into the limited clearance hydraulic tool 10.

Figure 2:
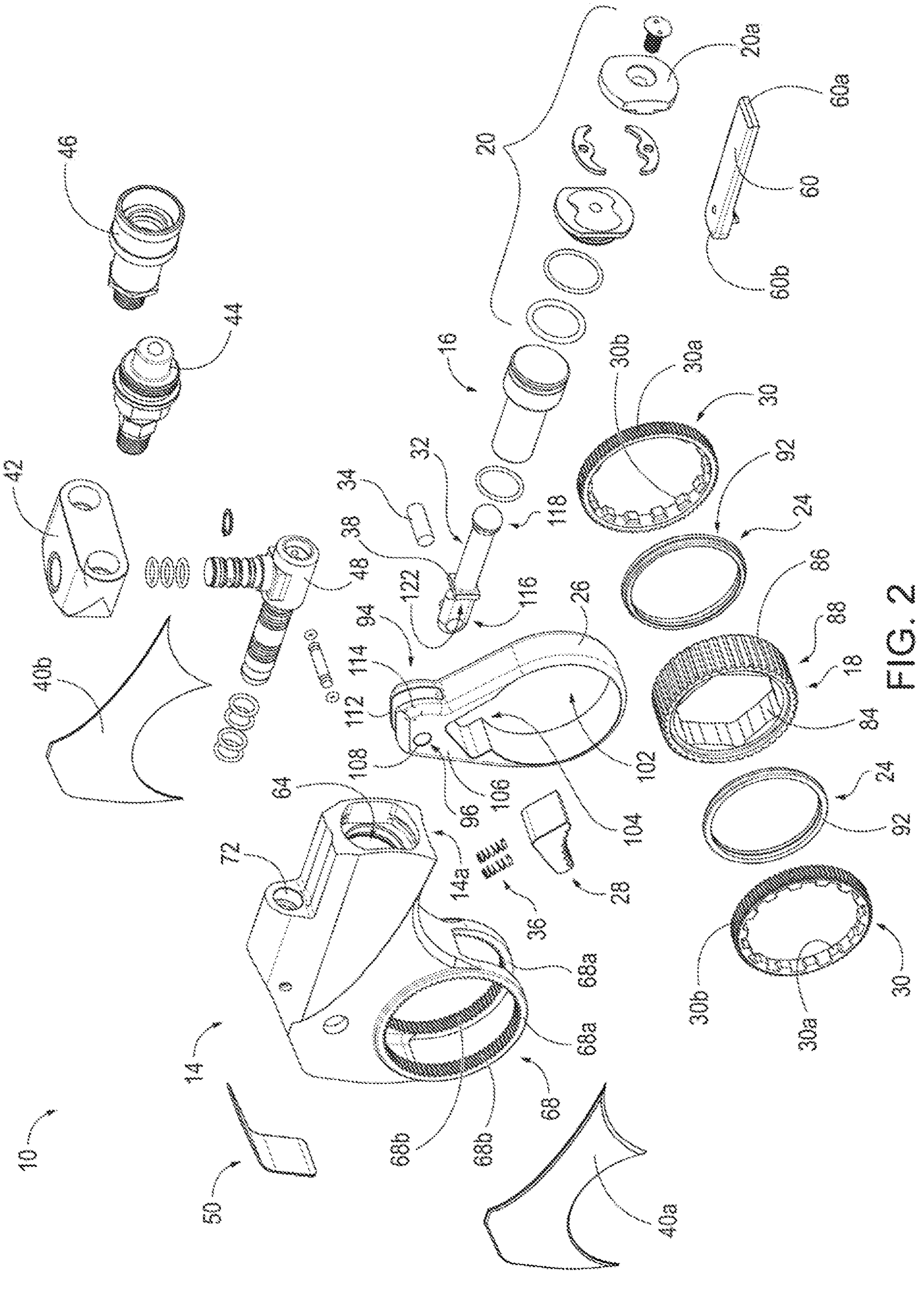
FIG. 2 is an exploded perspective view of the limited clearance hydraulic tool.

This rotation of the ratchet wheel 18 then causes rotation of the nut 62. However, because the integral receiving member 68 engages the reaction washer 58, which is stationary, the limited clearance hydraulic tool 10 is prevented from rotating about the nut 62. Instead, the nut 62 rotates about the ratchet axis 22 of the limited clearance hydraulic tool 10. Thus, the housing 14 of the limited clearance hydraulic tool 10 remains stationary when the nut 62 is being rotated. As shown in FIG. 2, the limited clearance hydraulic tool 10 can also include a pair of castle spline hubs 30. The pair of castle spline hubs 30 are coaxially disposed along the ratchet axis 22 so that that ratchet wheel 18 is disposed between them.

Each of the castle spline hubs 30 can define an inner diameter 30*a* for engagement with the outer diameter 58*b* of the reaction washer 58 and an outer diameter 30*b* for engagement with the respective inner diameter 68*b* of the hoop 68*a* of the integral receiving member 68. Notably, each of the inner diameters 30*a* of the spline hubs 30 can be castellated for selective engagement with outer diameter 58*b* of the reaction washer 58 and each of the outer diameters 30*b* of the spline hubs 30 can be splined for engagement with the inner diameter 68*b* of the respective hoop 68*a*. As will be appreciated, when the integral receiving member 68 engages the reaction washer 58, by way of one of the spline hubs 30, rotation between the reaction washer 58 and the limited clearance hydraulic tool 10 is prevented.

The ratchet wheel 18 of the limited clearance hydraulic tool 10 is configured to receive the nut 62 of the threaded fastener assembly 12 so as to at least partially radially surround the nut 62. Further, the integral receiving member 68 engages the outer diameter 58*b* of the reaction washer 58 by way of one of the inner diameters 30*a* of the castle spline hubs 30. Then, as will be described in more detail hereinafter, when hydraulic fluid is supplied to the limited clearance hydraulic tool 10, the ratchet wheel 18 will rotate.

Figure 6:
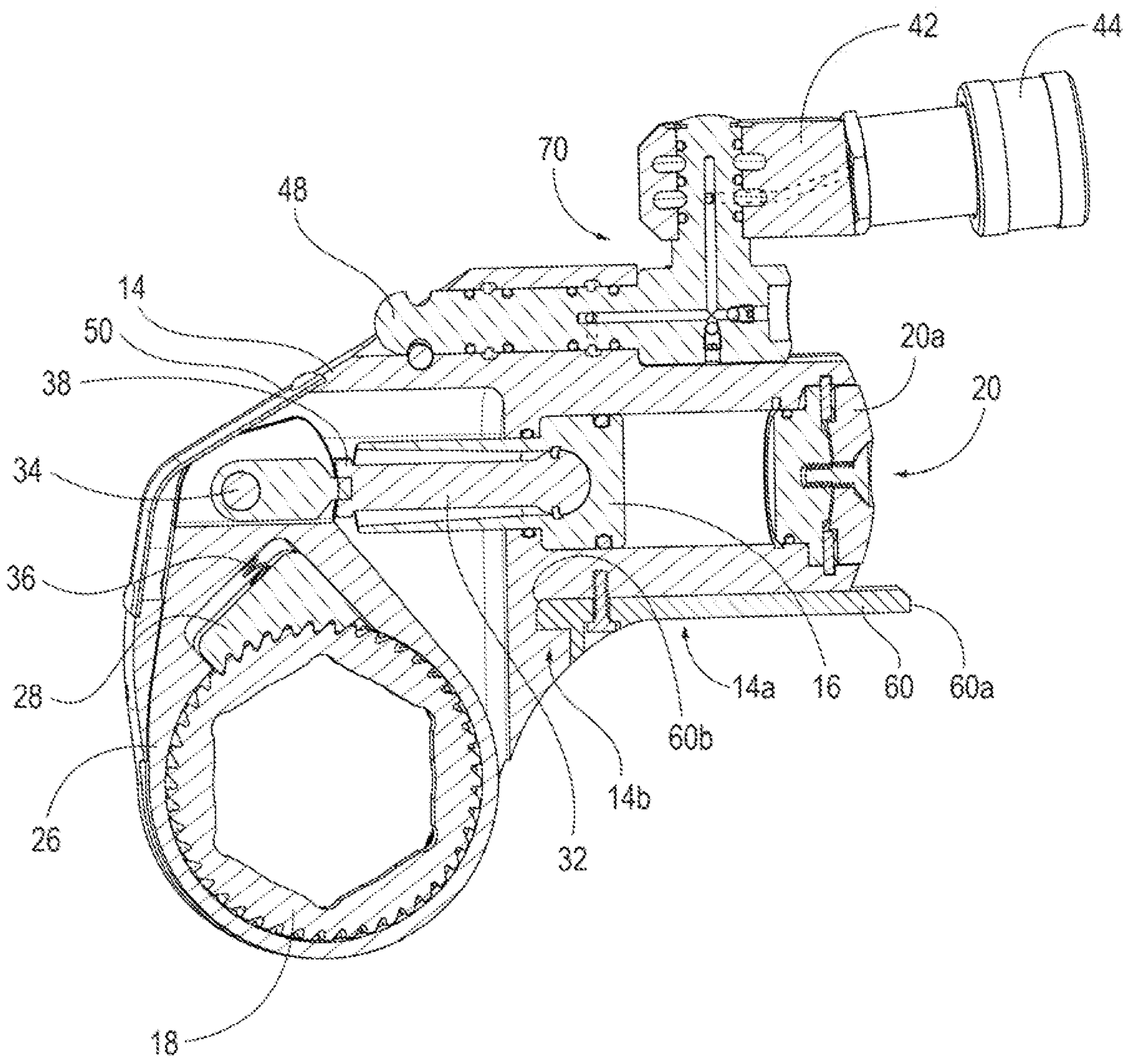
FIG. 6 is an elevation section view of the limited clearance hydraulic tool illustrating some of the fluid pathways of the limited clearance hydraulic tool.
Figure 7:
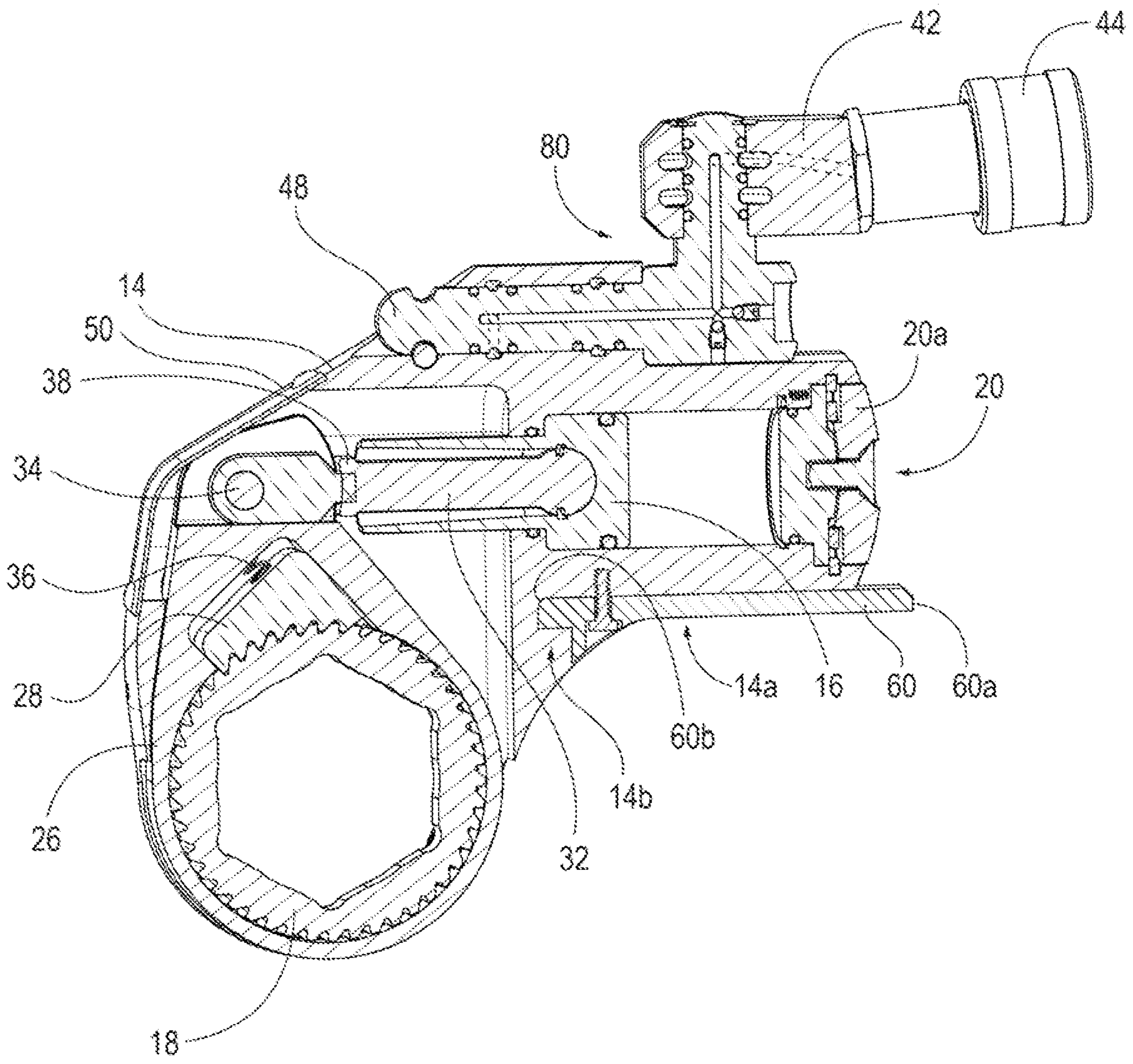
FIG. 7 is an elevation section view of the limited clearance hydraulic tool illustrating additional fluid pathways of the limited clearance hydraulic tool.

With attention to FIGS. 3-5, the housing 14 can define a first housing line 74 in fluid communication with the piston cylinder 64 through a first port 76 and a second housing line 78 in fluid communication with the piston cylinder 64 through a second port 82. Further, the first port 76 and the second port 82 are fluidically isolated from one another because of the piston 16. Additionally, the first housing line 74 and the second housing line 78 can include a first housing portion 124 and a second housing portion 126, respectively, that are not parallel and not perpendicular to the cylinder axis 66. With attention to FIGS. 6-7, further fluid pathways for communicating the fluid from the swivel head 42 to the housing 14 are illustrated. Notably, FIG. 6 illustrates the high pressure fluid path 70 and FIG. 7 illustrates the low pressure fluid path 80. Because of layout described hereinabove, the swivel head 42 and swivel body 48 can be utilized, thereby providing improved operational flexibility of the clearance hydraulic tool 10.

As noted hereinbefore, the limited clearance hydraulic tool 10 can include the piston 16. The piston 16 can be cylindrical in shape and be made of any number of materials that provide sufficient strength and rigidity for proper operation of the piston 16. The piston 16 is slidingly disposed within the piston cylinder 64 of the housing 14 and outputs force to cause subsequent movement of the ratchet wheel 18. The piston 16 can travel between an extended position (FIGS. 3-4) and a retracted position (FIG. 5). This movement of the piston 16 results in the subsequent rotation of the ratchet wheel 18, and hence the tightening or loosening of the nut 62.

As is shown in the figures, the connection pin 34 can have a circular cross-section. Further, as illustrated in FIG. 2, the connection pin 34 can be generally cylindrical in shape. It will be appreciated that the connection pin 34 can define a variety of grooves or depressions or other structural features without departing from the scope of this disclosure. Once the connection pin 34 is installed within the housing 14, the connection pin 34 can remain stationary with respect to the housing 14 when the limited clearance hydraulic tool 10 is being operated.

With reference to FIGS. 2-5, the limited clearance hydraulic tool 10 also includes the drive plate 26. The drive plate 26 is disposed within the housing 14 so as to at least partially radially surround the ratchet wheel 18. The drive plate 26 includes a contact surface 94 that defines a convex shape in the cross-sectional plane that is orthogonal to the ratchet axis 22.

Further, the drive plate 26 can define a pin bore 96 that receives the connection pin 34 and includes a contact surface 94 that is spaced from the pin bore 96. Additionally, the drive plate 26 defines a wheel cavity 102 that receives the ratchet wheel 18 and a pawl cavity 104 that receives the pawl 28. The pawl cavity 104 and the wheel cavity 102 are in fluid communication with one another.

The drive plate 26 can also include a first ear 106 and a second ear 112 that are spaced from one another. The first ear 106 and the second ear 112 can be of the same size and shape as one another. The first ear 106 can define a first ear bore 108 and the second ear 112 can define a second ear bore 114. The second ear bore 114 and the first ear bore 108 can be in registry with one another and cooperate with one another to define the pin bore 96 that receives the connection pin 34 to link the piston rod 32 and the drive plate 26 together to define the first point of contact.

With continued reference to the figures, the limited clearance hydraulic tool 10 also includes the push plate 38. The push plate 38 can include a contact face 122 that defines a concave shape in a cross-sectional plane that is orthogonal to the ratchet axis 22. Further, the contact face 122 of the push plate 38 can be complementary to the contact surface 94 of the drive plate 26 so that the contact face 122 of the push plate 38 can at least partially cup the contact surface 94 of the drive plate 26. The push plate 38 can be separate from or integral with the piston rod 32 without departing from the scope of this disclosure.

As shown in FIGS. 3-5, the piston rod 32 extends between the drive plate 26 and the piston 16 to connect the components together. The piston rod 32 includes a head end 116 and a tail end 118 disposed at opposite distal ends along the cylinder axis 66. Further, the head end 116 of the piston rod 32 is received between the first ear 106 and the second ear 112 of the drive plate 26 along the cylinder axis 66. As such, the head end 116 receives the connection pin 34 to join the drive plate 26 and the piston rod 32 together and the tail end 118 joins the piston 16 and the piston rod 32 together. Additionally, the push plate 38 is disposed between the head end 116 and the tail end 118.

It is noted that the piston rod 32 can selectively deviate from the cylinder axis 66 when the piston 16 travels between the extended position (FIGS. 3-4) and the retracted position (FIG. 5). However, the deviation is limited by engagement between the contact face 122 of the push plate 38 and the contact surface 94 of the drive plate 26. Notably, this deviation can be viewed when comparing FIG. 3 and FIG. 4 to one another.

FIG. 3 illustrates the limited clearance hydraulic tool 10 in an unloaded condition. In particular, an unloaded condition is one in which the limited clearance hydraulic tool 10 is not experiencing resistive rotative forces from the nut 62. Alternatively, a loaded condition is one in which limited clearance hydraulic tool 10 is experiencing resistive rotative forces from the nut 62. The aforementioned deviation can provide for improved operating efficiency of the limited clearance hydraulic tool 10 by properly directing the force from the piston 16 to the drive plate 26 and hence, the ratchet wheel 18.

With reference to FIGS. 1-5, the ratchet wheel 18 is rotatably received in the housing 14 and is configured to engage and rotate the associated threaded fastener assembly 12 as noted hereinbefore. The ratchet wheel 18 defines an internal radial surface 84 configured for contact with the associated threaded fastener assembly 12 and an external radial surface 86 that includes teeth 88 for engagement with the pawl 28.

The internal radial surface 84 can define a hexagonal shape for complete engagement with the nut 62. However, it will be understood that the internal radial surface 84 could have a different shape to engage other shapes of nuts or fasteners without departing from the scope of this disclosure. The external radial surface 86 can define a grooved or tooth-like shape for engagement with the pawl 28. The ratchet wheel 18 can be configured to only rotate in a single rotational direction.

As shown in FIGS. 1-2, the limited clearance hydraulic tool 10 can also include the magnetic ring 24. The magnetic ring 24 can be circular in cross-section and be of nominal thickness. However, other shapes and thicknesses are possible and contemplated. Additionally, the magnetic ring 24 can be made of a variety of materials that provide magnetic strength. The magnetic ring 24 can be disposed along the ratchet axis 22 so as to be outward from the ratchet wheel 18. Further, the magnetic ring 24 including a stop surface 92 that faces away from the ratchet wheel 18.

The stop surface 92 can be sized so as to contact the associated reaction washer 58 of the associated threaded fastener assembly 12 and prevent over-insertion of the associated threaded fastener assembly 12 into the limited clearance hydraulic tool 10 along the ratchet axis 22. As will be appreciated, the magnetic properties of the magnetic ring 24 aid in operation of the limited clearance hydraulic tool 10 for improved engagement with the nut 62 of the associated threaded fastener assembly 12. Further, the stop surface 92 can improve operation of the limited clearance hydraulic tool 10 by providing a uniform surface for proper engagement with the associated threaded fastener assembly 12.

The limited clearance hydraulic tool 10 also includes the pawl 28. The pawl 28 simultaneously contacts the drive plate 26 and the ratchet wheel 18. The pawl 28 is slidingly received in the pawl cavity 104 of the drive plate 26 to selectively engage the ratchet wheel 18 and limit rotation of the ratchet wheel 18 about the ratchet axis 22 to a single rotational direction. As shown in FIGS. 3-5, the pawl spring 36 can bias the pawl 28 away from the connection pin 34. This biasing encourages engagement between the pawl 28 and the racket wheel to limit rotation of the ratchet wheel 18 to a single rotational direction.

The limited clearance hydraulic tool 10 is configured to provide a first torque output for rotation of the associated threaded fastener assembly 12 in a first mode and a second torque output for rotation of the associated threaded fastener assembly 12 in a second mode. The second torque output is greater than the first torque output. As noted hereinbefore, the connection pin 34 can define a first point of contact between the piston rod 32 and the drive plate 26.

As shown in FIGS. 3-5, the connection pin 34 continuously connects the piston rod 32 and the drive plate 26 together to always drive and retract the drive plate 26 by transmitting the force from the piston 16 to the drive plate 26. Further, the connection pin 34 contacts the piston rod 32 and the drive plate 26 during the first mode and the second mode. However, the connection pin 34 is configured to deflect along the cylinder axis 66 in a direction away from the piston 16 in the second mode so as to allow the push plate 38 to contact the drive plate 26.

With continued reference to FIGS. 3-5, the push plate 38 can define a second point of contact between the piston rod 32 and the drive plate 26. The contact face 122 of the push plate 38 and the contact surface 94 of the drive plate 26 can cooperate to define the second point of contact that selectively occurs to transfer movement from the piston 16 to the drive plate 26.

As will be appreciated, the ability of the limited clearance hydraulic tool 10 to operate in the first mode and the second mode without the installation/removal of components provides numerous advantages. For example, when the limited clearance hydraulic tool 10 is operated in the first mode, less wear and tear occurs to the components of the limited clearance hydraulic tool 10. Further, when the limited clearance hydraulic tool 10 is operated in the second mode, more torque is output to the nut 62 and operational efficiency of the limited clearance hydraulic tool 10 is improved. Additionally, since the force is transmitted through the first point of contact and the second point of contact in the second mode, the components are exposed to less force, thereby decreasing the need for maintenance of the limited clearance hydraulic tool 10.

Notably, the push plate 38 is continuously spaced from the drive plate 26 during the first mode. However, the push plate 38 contacts the drive plate 26 during the second mode. Furthermore, the contact face 122 is spaced from the connection pin 34 at all times. When the push plate 38 contacts and drives the drive plate 26, the connection pin 34 transfers a majority of the force output from the piston 16 to the drive plate 26 and the push plate 38 transfers a minority of the force output from the piston 16 to the drive plate 26. However, when the push plate 38 does not drive the drive plate 26, the connection pin 34 transfers all of the force output from the piston 16 to the drive plate 26 and the push plate 38 transfers none of the force output from the piston 16 to the drive plate 26. Further still, the push plate 38 is separate and unique from the first point of contact mentioned hereinbefore.

As such, the push plate 38 selectively connects the piston rod 32 and the drive plate 26 together for driving the drive plate 26, depending on the deflection of the connection pin 34. In particular, when a lower torque is being applied to the ratchet wheel 18, the connection pin 34 does not deflect (i.e., remains completely straight and parallel to the ratchet axis 22 inn all planes) and the push plate 38 is spaced from the drive plate 26 (FIG. 3).

In contrast, when a higher torque is being applied to the ratchet wheel 18, the connection pin 34 deflects (i.e., all points of the connection pin 34 are not uniformly spaced from the piston 16) so that the push plate 38 directly contacts the drive plate 26 (FIG. 4). It will be appreciated that this deflection of the connection pin 34 (i.e., away from the piston 16) is minimal. However, said deflection results in the aforementioned direct contact, thereby distributing the force from the piston 16 to the drive plate 26.

It is also noted that the first point of contact and the second point of contact share a common concentric center so as to hold the piston rod 32 in position as the drive plate 26 moves. As illustrated, at least a portion of the pawl 28 shares a vertical axis with the second point of contact. Furthermore, the push plate 38 can be made of a first material that defines a first level of hardness and the connection pin 34 can be made of a second material that defines a second level of hardness. The first material and the second material are different from one another and the first level of hardness is greater than the second level of hardness. It will be appreciated that the level of hardness can be adjusted by a variety of methods, such as, for example heat treatment.

With reference back to FIG. 1, the swivel head 42 is shown and is configured to be connected to the associated first main line 44 and the associated second main line 46 that are fluidically isolated from one another. The associated first main line 44 is in fluid communication with the first housing line 74 and the associated second main line 46 is in fluid communication with the second housing line 78. As will be appreciated, the associated first main line 44 and the associated second main line 46 would be provided in variety of industrial and commercial settings.

As is shown in FIGS. 3-5, the swivel body 48 is connected to the swivel head 42. The swivel head 42 is configured to swivel about the swivel body 48 so as to define a pivot head axis 52 that is orthogonal to the cylinder axis 66. Further, the housing 14 defines a swivel body opening 72 that receives the swivel body 48. The swivel body 48 is configured to at least partially swivel about the housing 14 so as to define a pivot body axis 54 that is generally parallel to the cylinder axis 66. As the swivel body 48 is integral to the housing 14, the swivel body 48 is more resistant to damage than the traditional top mounted swivel design. Furthermore, because of this layout, a more compact footprint can be provided. Further still, such an arrangement allows for additional axes to be added for further rotational freedom.

Figure 8:
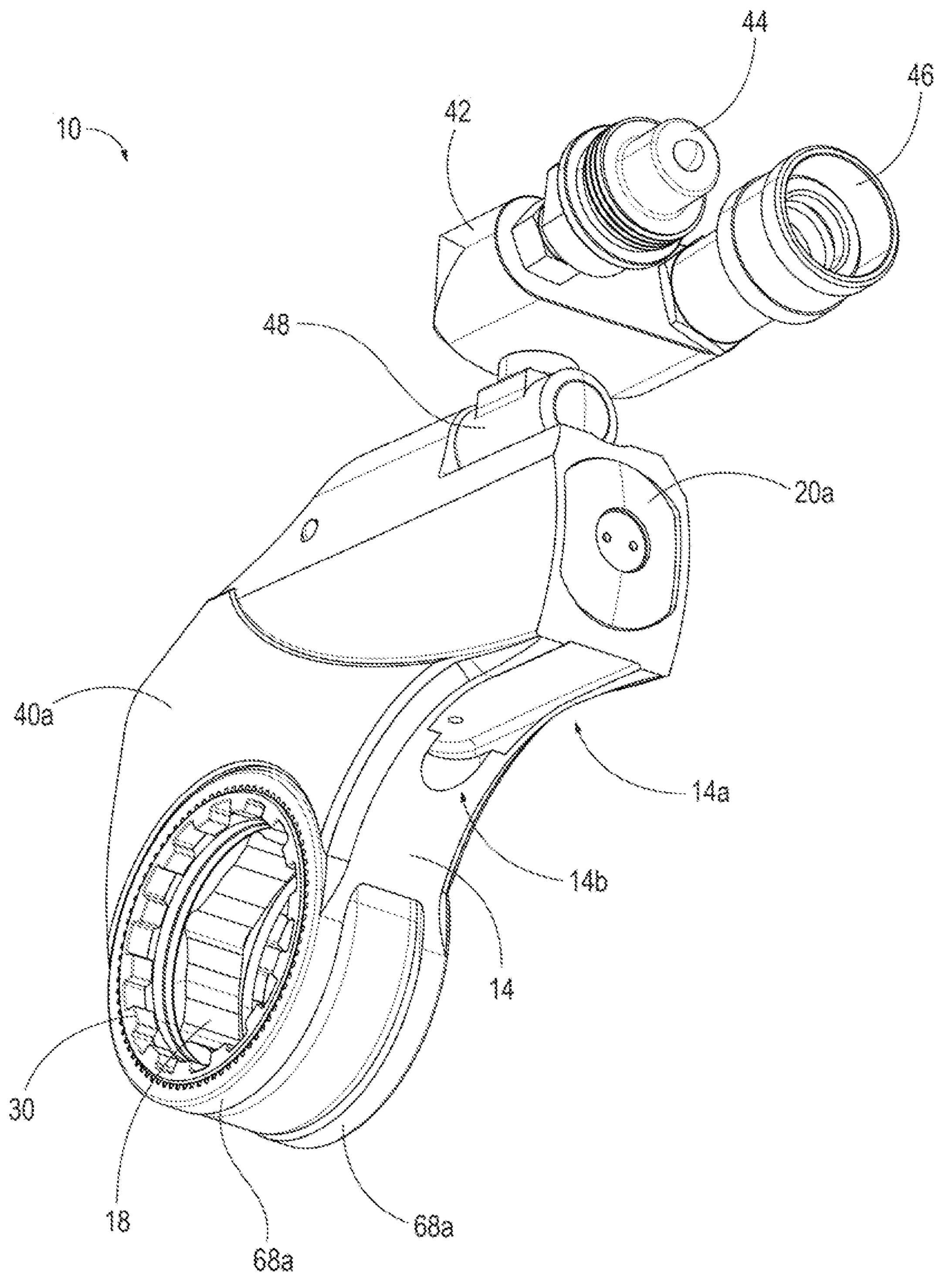
FIG. 8 is an elevation perspective view of the limited clearance hydraulic tool with a reaction pad of the limited clearance hydraulic tool removed therefrom.

As mentioned hereinbefore, the housing 14 can define the channel **14*a*. In particular, as shown in FIG. 8, the housing 14 also includes a ledge 14*b* that permits the reaction pad 60 to be slidably received by the housing 14. The reaction pad 60 can include a first end 60*a* and a second end 60*b*. The first end 60*a* and the second end 60*b* are disposed at opposite terminal ends of the reaction pad 60. As shown in FIGS. 3-8, the channel 14*a* of the housing 14 can be disposed on a side of the housing 14 that is opposite to the swivel head 42 along the pivot head axis 52. Further, the channel 14*a* can define a generally rectangular shape that extends primarily in a direction that is parallel to the cylinder axis 66. Notably, the channel 14*a* can removably receive the reaction pad 60**.

As shown in FIG. 2, the reaction pad 60 can have a generally rectangular shape. This shape can be complimentary to the channel 14*a*. As illustrated, the reaction pad 60 is removably attached to the housing 14. Notably, the ledge 14*b* of the housing 14 can retain the reaction pad 60 at least partially within the channel 14*a*. When the limited clearance hydraulic tool 10 is utilized to provide torque to a nut in the absence of a reaction washer, the reaction pad 60 can act as a reaction arm to prevent rotation of the limited clearance hydraulic tool 10 about the ratchet axis 22. Thus, the reaction pad 60 acts as a contact point for the limited clearance hydraulic tool 10 to a surrounding structure to prevent rotation of the limited clearance hydraulic tool 10, and more particularly the housing 14, with respect to the ratchet axis 22. As will be appreciated, the surrounding structure could include, for example, nuts and threaded portions that are not being engaged by the ratchet wheel 18 or flanges or other nearby components. Further, the reaction pad 60 transmits force received from this contact with the surrounding structure into the housing 14 without unnecessarily increasing the overall weight of the limited clearance hydraulic tool 10.

As illustrated, the reaction pad 60 defines a length (i.e., in a direction parallel to the cylinder axis 66) that is greater than a length (i.e., in a direction parallel to the cylinder axis 66) of the channel 14*a* of the housing 14. This difference in length between the reaction pad 60 and the channel 14*a* results in the first end 60*a* of the reaction pad 60 being a distance from the pivot head axis 52 that is greater than a distance that the endcap 14*a* is from the pivot head axis 52. This length of the reaction pad 60 allows for improved engagement with the surrounding structure.

As will be appreciated, the reaction pad 60 could be of different lengths without departing from the scope of this disclosure. For example, the reaction pad 60 could define a length that was equal to the of the channel 14*a* of the housing 14. Such an arrangement would result in the first end 60*a*, and hence the reaction pad 60 protruding from the channel 14*a*, and hence the housing 14. Alternatively, the reaction pad 60 could define a length that is greater than what is illustrated, thereby resulting in a protrusion of the first end 60*a* of the reaction pad 60 to a greater extent than is illustrated. Finally, the reaction pad 60 could be made of a variety of materials without departing from the scope of this disclosure.

A limited clearance hydraulic tool has been described above in particularity. Modifications and alterations will occur to those upon reading and understanding the preceding detail description. The invention, however, is not limited to only the embodiment described above. Instead, the invention is broadly defined by the appended claims and the equivalents thereof.

The invention claimed is:

1. A limited clearance hydraulic tool that provides torque to an associated threaded fastener assembly, the limited clearance hydraulic tool comprising:

- a housing that receives hydraulic fluid and defines a piston cylinder, the piston cylinder defining a cylinder axis;
- a piston slidingly disposed within the piston cylinder of the housing that outputs force and travels between a retracted position and an extended position;
- a ratchet wheel rotatably received in the housing, the ratchet wheel defining a ratchet axis and being configured to engage the associated threaded fastener assembly;
- a drive plate disposed within the housing so as to at least partially radially surround the ratchet wheel;
- a piston rod extending between the drive plate and the piston;
- a connection pin that defines a first point of contact between the piston rod and the drive plate, the connection pin continuously connecting the piston rod and the drive plate together to always drive and retract the drive plate by transmitting the force from the piston to the drive plate; and
- a push plate that defines a second point of contact between the piston rod and the drive plate, the push plate being separate and unique from the first point of contact, wherein the push plate selectively contacts the drive plate for driving the drive plate.

2. The limited clearance hydraulic tool of claim 1, wherein when the push plate contacts the drive plate, the connection pin transfers a majority of the force output from the piston to the drive plate and the push plate transfers a minority of the force output from the piston to the drive plate, and wherein when the push plate does not contact the drive plate, the connection pin transfers all of the force output from the piston to the drive plate and the push plate transfers none of the force output from the piston to the drive plate.

3. The limited clearance hydraulic tool of claim 1, wherein the push plate includes a contact face that defines a concave shape in a cross-sectional plane that is orthogonal to the ratchet axis and the drive plate includes a contact surface that defines a convex shape in the cross-sectional plane that is orthogonal to the ratchet axis, wherein the piston rod selectively deviates from the cylinder axis when the piston travels between the retracted position and the extended position, and wherein the deviation is limited by engagement between the contact face of the push plate and the contact surface of the drive plate.

4. The limited clearance hydraulic tool of claim 1, wherein the first point of contact and the second point of contact share a common concentric center so as to hold the piston rod in position as the drive plate moves.

5. The limited clearance hydraulic tool of claim 1, wherein the drive plate defines a pin bore that receives the connection pin and includes a contact surface that is spaced from the pin bore, wherein the push plate includes a contact face that is spaced from the connection pin, the contact face of the push plate and the contact surface of the drive plate cooperating to define the second point of contact that selectively occurs to transfer movement from the piston to the drive plate.

6. The limited clearance hydraulic tool of claim 5, wherein the contact face of the push plate is complementary to the contact surface of the drive plate so that the contact face of the push plate can at least partially cup the contact surface of the drive plate.

7. The limited clearance hydraulic tool of claim 1, further including a pawl that simultaneously contacts the drive plate and the ratchet wheel, wherein the drive plate defines a pawl cavity that receives the pawl and a wheel cavity that receives the ratchet wheel, wherein the pawl cavity and the wheel cavity are in fluid communication with one another, and wherein the ratchet wheel defines an internal radial surface configured for contact with the associated threaded fastener assembly and an external radial surface that includes teeth for engagement with the pawl, at least a portion of the pawl sharing a vertical axis with the second point of contact.

8. The limited clearance hydraulic tool of claim 7, further including a pawl spring that biases the pawl away from the connection pin, wherein the pawl is slidingly received in the pawl cavity of the drive plate to selectively engage the ratchet wheel and limit rotation of the ratchet wheel about the ratchet axis to a single rotational direction.

9. The limited clearance hydraulic tool of claim 1, wherein the piston rod includes a head end and a tail end disposed at opposite distal ends along the cylinder axis, wherein the head end receives the connection pin to join the drive plate and the piston rod together and the tail end joins the piston and the piston rod together, and wherein the push plate is disposed between the head end and the tail end.

10. The limited clearance hydraulic tool of claim 9, wherein the drive plate includes a first ear and a second ear that are spaced from one another so as to receive the head end of the piston rod along the cylinder axis, and wherein the first ear defines a first ear bore and the second ear defines a second ear bore that is in registry with the first ear bore, the first ear bore and the second ear bore cooperating to define a pin bore that receives the connection pin to link the piston rod and the drive plate together to define the first point of contact.

11. The limited clearance hydraulic tool of claim 9, wherein the push plate is made of a first material that defines a first level of hardness and the connection pin is made of a second material that defines a second level of hardness, wherein the first material and the second material are different from one another and the first level of hardness is greater than the second level of hardness.

12. The limited clearance hydraulic tool of claim 1, wherein the limited clearance hydraulic tool is configured to provide a first torque output for rotation of the associated threaded fastener assembly in a first mode and a second torque output for rotation of the associated threaded fastener assembly in a second mode, the second torque output being greater than the first torque output, and wherein the push plate is continuously spaced from the drive plate during the first mode and the push plate contacts the drive plate during the second mode.

13. The limited clearance hydraulic tool of claim 12, wherein the connection pin contacts the piston rod and the drive plate during the first mode and the second mode.

14. The limited clearance hydraulic tool of claim 12, wherein the connection pin is configured to deflect along the cylinder axis in a direction away from the piston in the second mode so as to allow the push plate to contact the drive plate.

15. The limited clearance hydraulic tool of claim 1, wherein the housing is a mono-block housing that includes an integral receiving member that is configured to engage an associated reaction washer of the associated threaded fastener assembly.

16. The limited clearance hydraulic tool of claim 15, further including a pair of castle spline hubs that are coaxially disposed along the ratchet axis so that the ratchet wheel is disposed therebetween.

17. The limited clearance hydraulic tool of claim 16, wherein the integral receiving member includes a pair of hoops that are least partially spaced from one another so as to receive the ratchet wheel therebetween, and wherein each of the hoops defines a hoop inner diameter that selectively engages the respective castle spline hub so as to prevent relative rotation between the associated reaction washer and the limited clearance hydraulic tool.

18. The limited clearance hydraulic tool of claim 1, further including a magnetic ring disposed along the ratchet axis so as to be outward from the ratchet wheel, wherein the magnetic ring including a stop surface that faces away from the ratchet wheel that is sized so as to contact an associated reaction washer of the associated threaded fastener assembly and prevent over-insertion of the associated threaded fastener assembly into the limited clearance hydraulic tool.

19. The limited clearance hydraulic tool of claim 1, wherein the piston, the ratchet wheel, the drive plate, and the piston rod are disposed in the housing.

20. The limited clearance hydraulic tool of claim 1, the housing defining a first housing line in fluid communication with the piston cylinder through a first port and a second housing line in fluid communication with the piston cylinder through a second port, wherein the first port and the second port are fluidically isolated from one another because of the piston.

21. The limited clearance hydraulic tool of claim 20, wherein the first housing line and the second housing line each include a portion that is not parallel and not perpendicular to the cylinder axis.

22. The limited clearance hydraulic tool of claim 20, further comprising:

a swivel head configured to be connected to an associated first main line and an associated second main line that are fluidically isolated from one another, wherein the associated first main line is in fluid communication with the first housing line and the associated second main line is in fluid communication with the second housing line; and a swivel body connected to the swivel head, wherein the swivel head is configured to swivel about the swivel body so as to define a pivot head axis that is orthogonal to the cylinder axis, wherein the housing defines a swivel body opening that receives the swivel body, the swivel body configured to at least partially swivel about the housing so as to define a pivot body axis that is generally parallel to the cylinder axis.

23. The limited clearance hydraulic tool of claim 1, further including a reaction pad with a first end and a second end, the first end and the second end being at opposite terminal ends of the reaction pad, wherein the housing defines a channel that at least partially receives the reaction pad.

24. The limited clearance hydraulic tool of claim 23, wherein a distance between the first end and the second end defines a length of the reaction pad and the channel defines a channel length, and wherein the channel slidably receives the reaction pad such that the length of the reaction pad is greater than the channel length.

25. The limited clearance hydraulic tool of claim 23, further comprising:

a swivel head configured to be connected to an associated first main line and an associated second main line that are fluidically isolated from one another;

a swivel body connected to the swivel head, wherein the swivel head is configured to swivel about the swivel body so as to define a pivot head axis that is orthogonal to the cylinder axis; and a removable endcap that is received by the housing so as to be disposed on the cylinder axis, wherein a distance between the first end of the reaction pad and the pivot head axis is greater than a distance between the endcap and the pivot head axis.

* * * * *